(12) United States Patent
Baier et al.

(10) Patent No.: US 12,466,494 B2
(45) Date of Patent: Nov. 11, 2025

(54) STRUCTURAL COMPONENT AND METHOD OF PROVIDING THE SAME

(71) Applicant: BBP Kunststoffwerk Marbach Baier GmbH, Marbach (DE)

(72) Inventors: Marc G. Baier, Marbach am Neckar (DE); Michael Straeter, Gerlingen (DE)

(73) Assignee: BBP Kunststoffwerk Marbach Baier GmbH, Marbach (DE)

( * ) Notice: Subject to any disclaimer, the term of this patent is extended or adjusted under 35 U.S.C. 154(b) by 439 days.

(21) Appl. No.: 17/887,446

(22) Filed: Aug. 13, 2022

(65) Prior Publication Data
US 2023/0051752 A1    Feb. 16, 2023

(30) Foreign Application Priority Data
Aug. 16, 2021 (DE) .................... 10 2021 121 278.2

(51) Int. Cl.
*B62D 25/00* (2006.01)
*B29C 45/00* (2006.01)
(Continued)

(52) U.S. Cl.
CPC ........ *B62D 25/087* (2013.01); *B29C 45/0001* (2013.01); *B29C 45/0005* (2013.01);
(Continued)

(58) Field of Classification Search
CPC ...... B62D 25/087; B62D 29/043; B60R 5/02; B60R 13/011; B29C 45/0001;
(Continued)

(56) References Cited

U.S. PATENT DOCUMENTS

| | | |
|---|---|---|
| 7,017,764 B2 | 3/2006 | Okada |
| 10,195,999 B1 | 2/2019 | Glickman et al. |

(Continued)

FOREIGN PATENT DOCUMENTS

| | | |
|---|---|---|
| DE | 10318414 A1 | 11/2003 |
| DE | 102007044428 A1 | 3/2009 |

(Continued)

OTHER PUBLICATIONS

Search Report for German Patent Application No. 10 2021 121 278.2, mailed Jun. 14, 2022.

*Primary Examiner* — Steven O Douglas
(74) *Attorney, Agent, or Firm* — Jason H. Vick; Amped IP LLC

(57) ABSTRACT

A structural component serves as a container for a vehicle. The structural component comprises a trough-shaped container section, an edge region, and fastening elements that are provided in the edge region. The container section forms a compartment and defines a bottom region and two or more wall regions, which are at least sectionally inclined with respect to the bottom region. The two or more wall regions are arranged between the bottom region and the edge region. The fastening elements are arranged and distributed around the container section. The container section and the edge region are formed of an injection moldable fiber reinforced (Continued)

thermoplastic material. The structural component at least sectionally has a porous internal structure that is formed by foaming the thermoplastic material.

24 Claims, 10 Drawing Sheets

(51) Int. Cl.
| | | |
|---|---|---|
| *B62D 25/08* | (2006.01) | |
| *B62D 29/04* | (2006.01) | |
| B29K 101/12 | (2006.01) | |
| B29K 105/26 | (2006.01) | |
| B29L 31/30 | (2006.01) | |

(52) U.S. Cl.
CPC ........ *B62D 29/043* (2013.01); *B29K 2101/12* (2013.01); *B29K 2105/26* (2013.01); *B29K 2995/0056* (2013.01); *B29L 2031/30* (2013.01)

(58) Field of Classification Search
CPC ............ B29C 45/0005; B29C 45/1703; B29C 45/1706; B29C 33/3835; B29K 2101/12; B29K 2105/26; B29K 2995/0056; B29L 2031/30
USPC .................................... 296/37.1, 37.2, 37.14
See application file for complete search history.

(56) References Cited

U.S. PATENT DOCUMENTS

| | | |
|---|---|---|
| 10,480,462 B2 | 11/2019 | Metzger |
| 10,882,219 B2 | 1/2021 | Diepenbrock et al. |
| 2010/0119417 A1* | 5/2010 | Motadel ................ B01L 3/5082 264/320 |
| 2017/0175685 A1 | 6/2017 | Metzger |
| 2018/0339439 A1* | 11/2018 | Yusa .................... B29C 44/3446 |
| 2019/0039659 A1 | 2/2019 | Glickman et al. |
| 2020/0290517 A1 | 9/2020 | Sabdad |

FOREIGN PATENT DOCUMENTS

| | | |
|---|---|---|
| DE | 102014012881 A1 | 3/2016 |
| DE | 102016206073 A1 | 10/2017 |
| DE | 202018104423 U1 | 9/2018 |
| DE | 102019135323 A1 | 6/2021 |
| DE | 102014212048 B4 | 3/2022 |
| FR | 2899177 A1 | 10/2007 |
| JP | H10-119079 A | 5/1998 |
| WO | WO 2021/123112 A1 | 6/2021 |

* cited by examiner

130

132

STRUCTURAL COMPONENT AND METHOD OF PROVIDING THE SAME

CROSS-REFERENCE TO RELATED APPLICATIONS

This application claims priority to German Patent Application No. 10 2021 121 278.2, filed on Aug. 16, 2021. The entire content of this priority application is incorporated herein by reference.

BACKGROUND

The present disclosure relates to a structural component. In certain embodiments, the present disclosure relates to a structural component that is producible by means of thermoplastic injection molding. The disclosure further relates to a method of providing an injection molded structural component.

In exemplary embodiments, the disclosure relates to such structural components that are used in vehicles, for instance within a vehicle body. Such structural components may form compartments, for instance for accommodating luggage and the like. Structural components may also be used to accommodate spare wheels as well as to accommodate components of the vehicle (for example, control units, batteries and the like) and the like.

Components that serve as a luggage compartment are known, for example, from FR 2 899 177 A1, US 2019/0039659 A1 and US 2020/0290517 A1. A component that serves as a spare wheel pan is known, for example, from DE 10 2007 044 428 A1. A component designed as a housing for control units is known, for example, from U.S. Pat. No. 7,017,764 B2. A component that serves as an air filter housing is known, for example, from US 2017/0175685 A1.

Vehicles, for example passenger cars, have a large number of assemblies and components. There is a continuing trend to produce components for vehicles by means of plastic injection molding. In this way, for example, housings for subassemblies, but also compartments for luggage and the like can be produced. One design goal in the design of vehicle components is regularly weight reduction. However, this must not be achieved at the expense of the function and stability of the components. Both in operation and in the manufacture of vehicles, more and more attention is being paid to sustainability and environmental compatibility. This includes using as few raw materials as possible (especially primary raw materials). Furthermore, there are regulatory interventions in various countries, for example, charges are imposed depending on certain (consumption-dependent) emission values.

Conversely, alternative drives (electromobility and the like) can provide design freedom that allows customer benefits to be increased. For example, purely electric vehicles (BEVs) no longer require an internal combustion engine; instead, compactly designed electric motors are installed. Accordingly, designs are possible, in which, instead of a (conventional) engine compartment occupied by the combustion engine, a free space can be used at the front or rear of the vehicle, for example to accommodate luggage or vehicle components.

Particularly at the front (front end, front end) of vehicles, possible regulations regarding crash safety (pedestrian crash) and technical design goals (aerodynamic drag) must also be observed. Therefore, there is often space available that can be used for other purposes than accommodating internal combustion engine components. It should be noted that the front end of a vehicle naturally accommodates relevant components other than internal combustion engine components. This includes, for example, steering components, chassis components, air conditioning components, control components and the like. Therefore, usually a predefined structure must be taken into account when implementing further components and functions.

For example, in pure e-vehicles it is often possible to implement an additional luggage compartment in the front of the vehicle, which houses the combustion engine in conventional vehicles. Due to present boundary conditions (steering system, front axle and the like), self-supporting trunk pans are used, for example, which have sufficient inherent stability. The inherent stability takes into account usual load cases that may arise in daily operation. In the case of luggage compartments, for example, this includes certain accelerations (e.g. acceleration, braking, and fast cornering) or impacts (e.g. driving through potholes). The goal here is to avoid structural damage.

However, this often results in a non-negligible mass for such components. This means that, despite the increased customer benefit, these components contradict the weight reduction that is actually desired.

In view of this, it is an object of the present disclosure is to present structural components for vehicles that serve as vehicular containers.

It is a further object of the present disclosure to present structural components that contribute to an increased customer benefit while at the same time observing other boundary conditions in the design of vehicles.

It is a further object of the present disclosure to present structural components that serve as containers, which ensure sufficient structural stability, and which are nevertheless lightweight.

It is a further object of the present disclosure to present structural components that are suitable for series production and mass production in the automotive environment.

It is a further object of the present disclosure to present a corresponding method for providing a structural component that serves as a.

SUMMARY

According to a first aspect, these and other objects are achieved by a structural component that serves as a container for a vehicle, comprising:
- a trough-shaped container section forming a compartment and having a bottom region and two or more wall regions, which are at least sectionally inclined relative to the bottom region,
- an edge region,
- wherein the two or more wall regions are arranged between the bottom region and the edge region,
- fastening elements that are provided in the edge region,
- wherein the fastening elements are arranged and distributed around the container section,
- wherein the container section and the edge region are formed of a fiber-reinforced thermoplastic material that can be processed by injection molding, and
- wherein the structural component at least sectionally has a porous inner structure produced by foaming the thermoplastic material.

According to another aspect, the above and other objects are achieved by a structural component that serves as a container for a vehicle, comprising:

a trough-shaped container section forming a compartment and having a bottom region and two or more wall regions, which are at least sectionally inclined relative to the bottom region, an edge region, which is designed in particular as a circumferential edge region, wherein fastening elements are provided in the edge region, which are arranged and distributed around the container section, in particular arranged and distributed circumferentially around the container section, wherein the container section and the edge region are formed of a fiber-reinforced thermoplastic material that is processable by injection molding, and wherein the structural component at least sectionally has a porous inner structure produced by foaming the thermoplastic material.

In accordance with the disclosure, it is possible to manufacture such components while meeting the strength and stability targets at a significantly reduced weight. Series production and mass production are possible at a reasonable additional cost for foaming.

Suitable plastic materials include thermoplastics for technical applications. This includes, for example, polypropylene (PP), polyamide (PA), polycarbonate (PC), acrylonitrile butadiene styrene plastic (ABS), their derivatives and comparable plastics. The thermoplastic material is usually reinforced with fibers, for example glass fibers, aramid fibers (Kevlar), carbon fibers and the like.

Foaming can increase the stiffness and strength of the component. The density inside the component can be reduced. Dimensional stability can be increased. Shrink marks and similar process-related effects with detrimental effects on component quality can be reduced.

The production of the at least partially foamed component from a thermoplastic material can be referred to as thermoplastic foam injection molding. The foaming can take place as chemical foaming or physical foaming. Thermoplastic foam injection molding may result in a significant weight reduction. In an exemplary embodiment, a reduction in weight of at least 10% can be achieved compared to a structural component with a non-porous design. In an exemplary embodiment, a reduction in weight of at least 20% can be achieved.

In physical foaming, a gas (for example carbon dioxide or nitrogen) is purposefully introduced into the melt. During processing, mixing of the plastic and gas takes place, with the aim of achieving a solid, non-porous (i.e. compact) boundary region and a gradual reduction in density (due to enclosed bubbles) in the core. In the finished component, gas-filled cells of a certain size and distribution are present, which displace or replace a certain volume of plastic. This results in the potential weight saving.

In chemical foaming, a blowing agent is added to the material. The blowing agent is designed to release a gas for foaming, for example nitrogen or carbon dioxide, in the melting temperature range used.

In the context of the present disclosure, a structural component is a potentially self-supporting component that does not necessarily require extensive support. Thus, it is not about an insert that receives large-area support from other components.

The structural component is manufactured, for example, in the manner of a tub, trough or trough. The structural component serves, by way of example, as a compartment for accommodating luggage, as a spare wheel pan, as a housing for control units and the like. In an exemplary embodiment, the structural component is self-supporting, with fastening to a small number of fastening elements and with no or only insignificant support for the floor. Accordingly, the component is to be made sufficiently rigid and stable in this area and in adjacent areas.

In an exemplary embodiment, the edge region is spaced from the bottom region, similar to a collar. Accordingly, the structural component can rest at least with the edge region on a surrounding structure in the vehicle, and can be fastened there.

The fastening elements are, for example, form-fit elements in the form of recesses (holes) and domes. However, it is also conceivable to provide fastening elements in the form of adhesive surfaces.

A wall region may comprise a continuous wall. Accordingly, the structural component may be designed as an integrally manufactured and designed component. In other words, according to this embodiment, the structural component is made from one and the same material (glass fiber-reinforced thermoplastic) using one and the same mold. Nevertheless, this does not preclude the integration of customary additional components for assembly into or fastening to the structural component. This applies, for example, to inserts for fastening elements and the like.

However, a wall region can also provide a support structure for an insert/support. In this way, the structural component at least sectionally serves as a framework. According to this embodiment, an insert can be placed in the container section to line it, at least partially.

According to another exemplary embodiment of the structural component, the two or more wall regions extend between the bottom region and the edge region, the edge region being configured, at least sectionally, as a collar projecting from the container section. In other words, the structural component can be inserted in and fastened to a given receptacle, for example, on the front end or rear end of a vehicle.

According to a further exemplary embodiment of the structural component, the bottom region is offset in a main demolding direction relative to the edge region. In this way, the structural component can, for example, be inserted in an assembly opening on the front end of the vehicle and fastened there. If the edge region is arranged at the upper end of the structural component, it can likewise serve as a trim there. According to an exemplary configuration, the structural component is designed similar to a tub with a circumferential edge.

According to a further embodiment, the structural component is manufactured by means of an open-close mold. In this way, the complexity of the mold can be reduced—despite the sometimes considerable dimensions. According to this embodiment, there is primarily one main demolding direction and no secondary demolding directions. Lateral slides, movable inserts and the like are dispensed with wherever possible. In other words, the structural component according to this embodiment—viewed in the main demolding direction—has no undercut design elements that cannot be demolded in the main demolding direction.

However, it is also conceivable to use lateral slides, inserts and the like to form specific geometries and, if required, undercuts.

According to another exemplary embodiment, the structural component further comprises a sealing portion adjacent to an upper end of the container section. The sealing portion is exemplarily a circumferential sealing portion. In this way, a sufficiently tight sealing can be achieved during operation. In an exemplary embodiment, the sealing portion is a circumferential sealing portion.

The sealing portion is used, for example, to accommodate a seal, in particular a circumferential seal. The seal can, for example, form a border to a hood with which the structural component makes defined contact with the hood in a closed position of the hood.

In an exemplary embodiment, the circumferential sealing portion at least approximately defines a plane that is inclined relative to the horizontal and is inclined downward in the direction of travel. In the exemplary embodiment with the trunk pan arranged in the front of the vehicle, the direction of travel refers to forward travel.

By way of example, the container section has a cross-section—along a vertically oriented longitudinal center plane through the vehicle—that is approximately trapezoidal. The trapezoid has a substantially horizontal underside (bottom), two sides (front wall and rear wall), which are substantially parallel to one another or slightly inclined to one another in a V-shape, the front wall having a smaller vertical extent than the rear wall, and an upper side (open area), which is inclined with respect to the horizontal and is the imaginary connection of the upper ends of the front wall and the rear wall. It is understood that for manufacturing reasons (demoldability), the front wall and the back wall do not have to be oriented perfectly parallel to each other.

According to another exemplary embodiment of the structural component, the fastening elements in the edge region are selected from the group consisting of the following: adhesive surfaces, fastening holes, domes, elevations, recesses and fastening tabs. The fastening elements may have openings in the edge region. However, the fastening elements may also be closed.

According to a further exemplary embodiment of the structural component, at least one wall region of the container section is stepped and provided with a support region, which extends approximately parallel to the bottom region. In this way, a possibility for supporting and fastening the container section can also be provided there. Such a support region can be implemented without any great additional effort on the part of the mold.

According to another exemplary embodiment of the structural component, at least one fastening element is formed in the support region of the wall region, in particular a raised or recessed fastening element and/or an adhesive surface. Fastening elements can also be formed in the support region of the wall. Closed fastening elements are suitable, since the support region is part of the container section.

According to another exemplary embodiment of the structural component, the container section has a front wall, a rear wall, and first and second side walls, the front wall being offset from the rear wall in a direction of travel of the vehicle. In this way, a compartment for accommodating luggage, components or the like is provided. The space available in the respective vehicle concept can be used in a targeted manner.

According to a further exemplary embodiment of the structural component, the bottom region of the container section extends substantially horizontally. According to a further exemplary embodiment of the structural component, the edge region, in particular in the vicinity of the sealing portion, at least approximately defines a plane, which is inclined relative to the horizontal and is inclined downwards in the direction of travel. In this way, a wedge-shaped design of the vehicle can result overall when used as a component arranged in the front of the vehicle. In order to achieve low aerodynamic drag, hoods are often designed to be streamlined and inclined downward in the direction of travel.

According to another exemplary embodiment of the structural component, at least one wall region of the container section has demoldable stiffening elements in a main demolding direction, in particular in the form of beads and/or ribs with vertical longitudinal extension. In other words, these stiffening elements can be provided without excessive additional effort in the mold design.

According to another exemplary embodiment, the structural component is made at least proportionally from a recyclate. Recyclate is usually obtained from plastic waste, whereby various process steps are required, for example sorting, cleaning, processing, grinding and/or granulating. It has been shown that recyclate materials can also be used for production by means of thermoplastic foam injection molding.

In this way, the use of primary raw materials can be further reduced. In an exemplary embodiment, the recyclate proportion is at least 10%. In an exemplary embodiment, the recyclate proportion is at least 20%. In an exemplary embodiment, the recyclate proportion is at least 30%.

According to another exemplary embodiment, the structural component is made at least proportionally from an engineering biopolymer. For example, technical biopolymers are polylactide-based biopolymers (PLA). Such materials can be used to substitute common thermoplastics such as polypropylene or polyamide, at least in certain applications. Fiber reinforcement is possible.

Currently, such biopolymers lead to higher material costs compared to conventional thermoplastic materials. The at least partially porous design of the structural component reduces the material input and thus the costs.

According to another exemplary embodiment, the structural component has a reduced density by means of negative embossing. So-called negative embossing involves a defined opening stroke in the mold during solidification of the component. Boundary regions are usually already solidified. The core, which is at least partially porous due to foaming, can be further expanded by negative embossing so that the density in the core can be further reduced.

The foaming of the material can be supported by a targeted opening of the mold by a defined, small opening stroke before final cooling. This so-called negative embossing takes place based on a (low) initial wall thickness and can comprise a stroke in the range of a few tenths of a millimeter to a few millimeters, without any additional material being sucked in.

The volume made available to the injected material increases accordingly. As a result, the core of the structural component in particular becomes even more porous. The cells formed by the gas in the component expand accordingly. The aim is still to produce a sufficiently fine-cell foam structure with a compact boundary layer.

The design strength of the component can be further increased. This means that an even lower overall weight can be achieved under a defined load. The component takes on the character of a sandwich without the need for a composite structure made of several materials.

According to a further exemplary embodiment of the structural component, the bottom region is designed to be flat, at least sectionally, the bottom region having a stiffening structure with a plurality of stiffening elements, in particular with ribs and/or beads. In this way, the bottom region can be made sufficiently rigid and stable, for example in the case of a structural component that is self-supporting, at least sectionally, without external support in the bottom region. This also applies to extreme load cases (e.g. driving through a pothole when loaded with heavy but movable luggage items).

In certain embodiments, when the container section is used to hold luggage and the like, an at least partially flat bottom region can be used. However, such a flat bottom region has—without further design measures—only limited rigidity. Therefore, a reinforcement is recommended. The stiffening structure is for instance formed on the underside of the floor, at least substantial parts thereof. In this way, the upper side of the floor facing the interior (compartment) can be made sufficiently smooth.

According to another exemplary embodiment of the structural component, a stiffening structure is formed in the edge region, in particular in the vicinity of a fastening element. I.e., the edge region, which is designed similar to a collar or a hat brim, for example, can also be provided with a stiffening structure. This may have the effect that forces and moments are transmitted to a considerable extent via fastening elements in the edge region in the case of an at least partially self-supporting structure of the structural component.

According to another exemplary embodiment of the structural component, the stiffening structure has demoldable ribs in the main demolding direction, which are formed in particular on an underside of the base.

In this way, the upper side of the base facing the inner area of the container section remains partially or completely smooth. Designs are also conceivable, in which ribs or similar design elements are formed on the upper side of the base.

According to another exemplary embodiment of the structural component, the stiffening structure has at least one bionic design engineered pattern comprising a plurality of stiffening elements. A bionic design engineered pattern uses construction methods from biology. These are transferred to technical applications. Bionic design engineered formations are possible, which include models from flora and fauna for stiffening structures there, and which ensure a favorable ratio between weight and strength. Similar results can be achieved with technical components if a suitable bionic design engineered pattern is applied.

Among these structures, those can be transferred to technical conditions that are technically feasible and, above all, producible in accordance with customary design principles. This applies, for example, to certain rib designs for reinforcing structures that are in itself fragile. It should be noted that production by means of plastic injection molding, for example, has certain boundary conditions, such as certain minimum wall thicknesses, minimum distances, draft angles, the avoidance of material accumulations and only limited design freedom with regard to the complexity of the mold.

According to another exemplary embodiment of the structural component, the bionic design engineered pattern is selected from the group of formations consisting of: spider web, bamboo stalk, water lily leaf blade, mushroom lamella, turtle shell, honeycomb, limpet shell (for example, common limpet—patella vulgata), rock algae (diatoms), and combinations thereof.

These formations are suitable for stiffening elements, for example to stiffen the bottom region of the structural component, which is flat, at least sectionally. An application can also be made to stiffen the edge region, in particular in the vicinity of the fastening elements. It has been shown that conventional engineering stiffening structures (for example cross ribs in 90° orientation) can be replaced in this way. However, these formations are also suitable for partial, skeletal or framework-like stiffening structures that connect different (loaded) sections of the structural component.

According to another exemplary embodiment of the structural component, the stiffening structure at the bottom region has a central section with a first bionic design engineered pattern and outer sections adjacent to the central section with a second bionic design engineered pattern. In this way, suitable formations can be combined. This can be used to optimize properties of the structural component in terms of strength, stiffness, vibration behavior, resonance behavior, natural frequencies and the like. This can also be applied to local areas of the structural component that are subject to specific loads.

By way of example, the outer areas are areas, which—viewed in the direction of travel—are located to the right and left of the central area. This applies in particular to structural components, in which the longer side extends parallel to the transverse direction in the vehicle and the shorter side parallel to the longitudinal direction.

According to a further exemplary embodiment of the structural component, a bionic design engineered pattern based on a turtle shell is provided in the central section, while a bionic design engineered pattern based on mushroom lamellae or a spider web is provided in the outer sections. In this way, a favorable ratio of strength, weight and resonance behavior is obtained, for example, for a flat bottom of a container section of a self-supporting structural component. In an exemplary embodiment, the bionic design engineered pattern in the outer sections is fanned out toward the central section.

According to a further exemplary embodiment, the structural component is formed as a front trunk pan, in particular as a self-supporting front trunk pan. According to a further exemplary embodiment, the structural component is formed as a rear trunk pan, in particular as a self-supporting rear trunk pan. According to a further exemplary embodiment, the structural component is formed as a spare wheel pan, in particular as a self-supporting spare wheel pan. According to a further exemplary embodiment, the structural component is configured as a housing for control units, at least as a partial housing thereof. According to a further exemplary embodiment, the structural component is designed as an air filter housing, at least as a partial housing thereof.

According to another exemplary embodiment, the structural component reinforces a body-side crash structure of the vehicle. This can be used, for example, when used as a front or rear trunk pan. If the structural component has sufficient inherent stability and is designed, for example, as a self-supporting structural component, this increases the strength of the vehicle, for example in the case of the front body or the rear body, if the structural component is mounted on corresponding receptacles. In this way, the structural component can be connected directly or indirectly to the body and possibly to other loadbearing parts of the vehicle, thus favorably influencing the crash behavior. Conversely, this can lead to material savings and a reduction in the weight of other components of the vehicle.

According to another aspect, the above and other objects are achieved by a method of providing an injection molded structural component for a vehicle, comprising the following steps:

providing a reference design subject to at least one structural constraint that takes into account at least one reference load, determining at least one design parameter, in particular a stiffening structure and/or a wall thickness of the structural component, computer-aided analysis to determine a load condition at a given reference load, optimizing the geometry of the component based on the reference design, comprising:

optimizing the component using bionic design engineering techniques to select, arrange, and detail stiffening elements of the stiffening structure, and/or optimization of the wall thickness of the component, taking into account an at least partially porous internal structure, wherein the optimization takes into account the at least one structural constraint and the weight of the structural component, forming an injection mold based on the optimized geometry, and manufacture of the structural component with the injection mold by means of thermoplastic foam injection molding to produce the at least partially porous internal structure.

It is understood that the process according to the disclosure can be arranged analogously to the embodiments of the structural component according to the disclosure.

According to an exemplary embodiment of the method, the step of optimizing the geometry of the component further comprises:

defining of a defined opening stroke of the injection mold to increase the wall thickness and reduce the density of the structural component.

The optimization refers, for example, to measures to increase the wall thickness while reducing the given density. For this purpose, measures to create a porous inner structure can be used. The optimization can also refer to the generation and design of structural stiffeners, for example a rib structure and/or bead structure.

The optimization is usually performed in a specific application area, for example in the bottom region or edge region. The optimization usually concerns measures to achieve a certain strength and stiffness of the structural component, whereby the weight of the component is to be reduced.

Basic patterns and formations of similarly loaded biological models from fauna and flora can be used for areal bracing. The transfer to technical structures includes, for example, a reduction of the formations to their basic structures. Furthermore, an arrangement and adaptation of the stiffening elements is usually carried out taking into account given load paths (force paths). The design and arrangement is carried out taking into account a design suitable for production.

Suitable biological formations include diatoms (rock algae), radiolarians, shell structures (for example, turtle), and planar leaf structures (for example, water lily). These formations can be combined with each other. It is advisable to arrange them, at least sectionally, in stressed areas, for example while taking into account the main demolding direction.

It is to be understood that the previously mentioned features of the invention and those mentioned in the following may not only be used in the respectively indicated combination, but also in other combinations or as isolated features without leaving the spirit and scope of the present invention.

BRIEF DESCRIPTION OF THE DRAWINGS

Further features and advantages of the disclosure are disclosed by the following description of a plurality of exemplary embodiments, with reference to the drawings, wherein.

EMBODIMENTS

Figure 1:
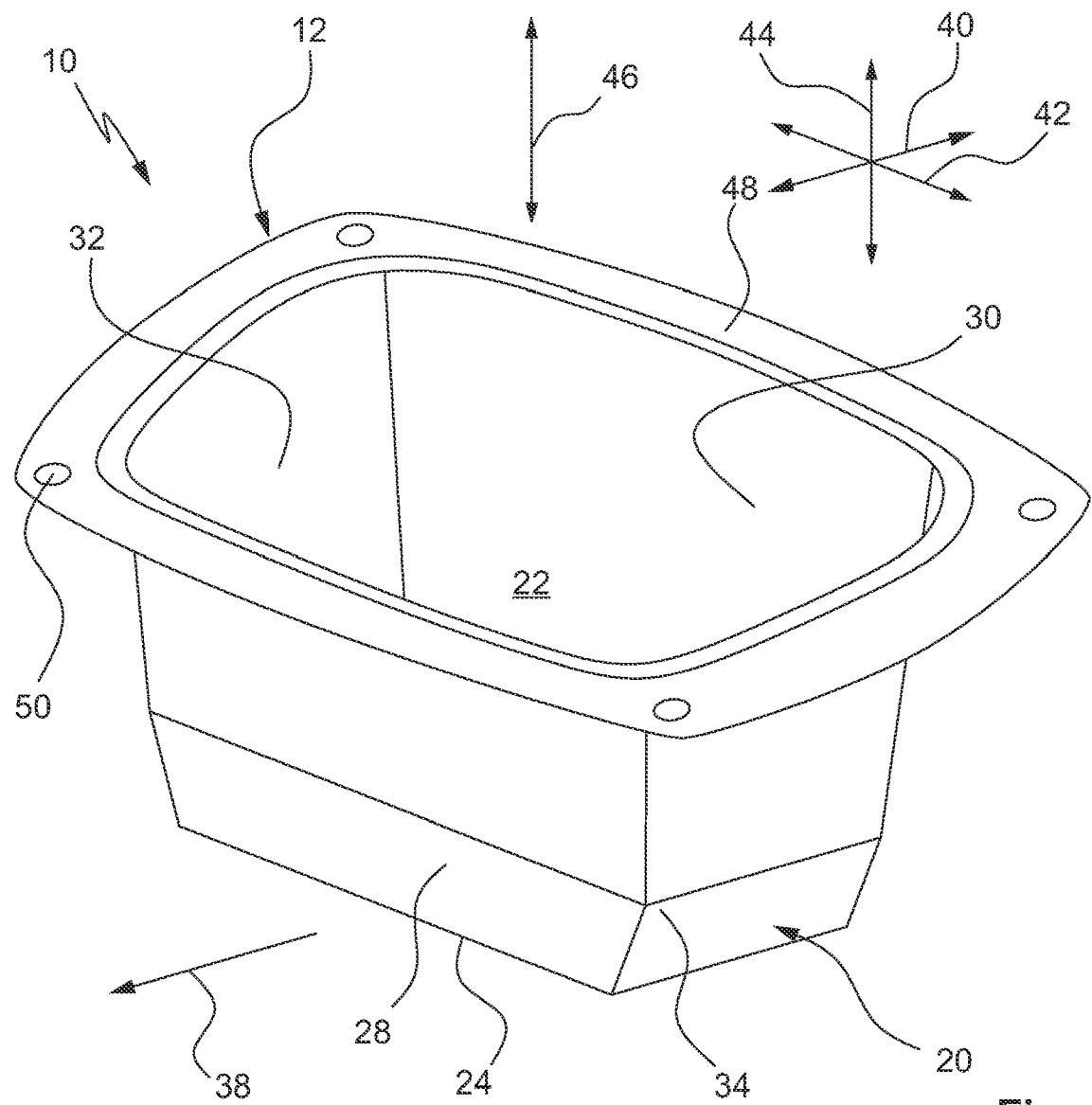
FIG. 1: is a simplified perspective view of a structural component that serves as a container.
Figure 2:
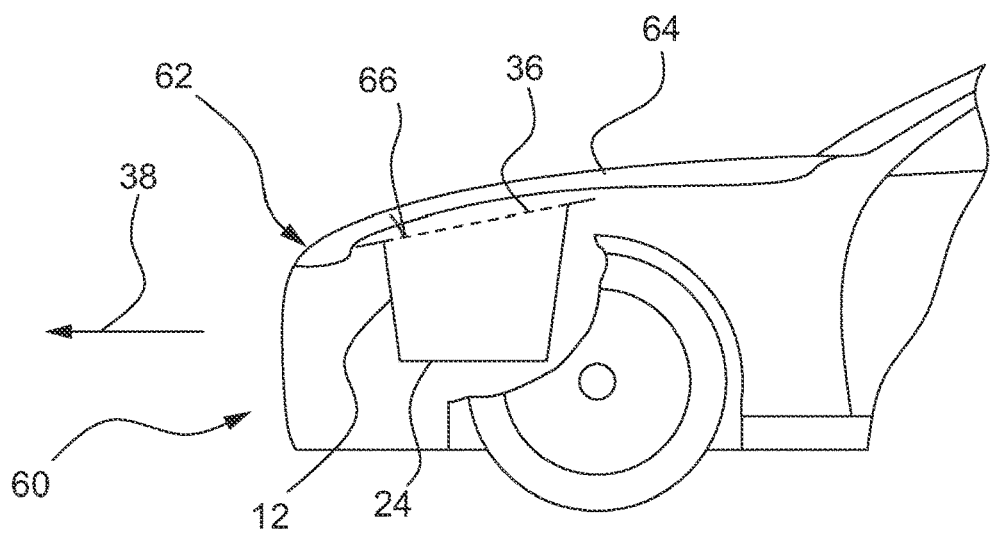
FIG. 2: is a simplified side view of the structural component according to FIG. 1 in a state installed in a front end of a vehicle.

With reference to FIGS. 1 and 2, a general embodiment of a structural component is illustrated, in which various aspects of the present disclosure are applicable. In addition, based on FIGS. 1 and 2, reference is made to the more detailed embodiment of a structural component shown in FIGS. 3-5.

Further exemplary embodiments of respective structural components are illustrated in connection with FIGS. 16, 17 and 18. With respect to certain features, reference is made in this connection to the following description of FIGS. 1-5. The skilled person will consult these embodiments to complete the embodiments according to FIGS. 16-18 and other embodiments as needed.

FIG. 1 shows a perspective view of a structural component designated by 10, which serves as a container. In the exemplary embodiment, the structural component 10 is formed as a trunk pan 12, for example as a front trunk pan 12, compare FIG. 2. The structural component 10 shown in FIG. 1 has a container section 20 that defines a compartment (interior) 22. The container section 20 is of approximately tub-shaped or trough-shaped configuration. In the exemplary embodiment, the container section 20 includes a bottom region 24 and wall regions 28, 30, 32, 34 that define the compartment 22 together with the bottom region 24.

In FIG. 1, the direction of travel (during forward travel) is further illustrated by an arrow designated by 38, compare again FIG. 2. Therefore, the wall region 28 can be referred to as the front wall, the wall region 30 as the rear wall, and the wall regions 32, 34 as the side walls.

In FIG. 1, arrows labeled by 40, 42, 44 illustrate a Cartesian coordinate system. Arrow 44 indicates the height extension (vertical). Arrows 40, 42 are oriented horizontally and perpendicular to the vertical (arrow 44). Arrows 40, 42 are oriented perpendicular to each other. Arrow 40 denotes a longitudinal extension (longitudinal direction), substantially parallel to the direction of travel 38. Arrow 42 denotes a lateral extension (lateral direction), substantially perpendicular to the direction of travel 38. Arrow 38 is parallel to a vertically oriented longitudinal center plane through the vehicle defined by arrows 40, 44 in the exemplary embodiment. In the exemplary embodiment, the longitudinal center plane intersects the structural component 10 approximately centrally. In the exemplary embodiment, the coordinate system 40, 42, 44 is used to illustrate directions and absolute/relative positions and orientations. It is understood that other coordinate systems may also be used to describe embodiments according to the disclosure. The person skilled in the art can perform any transformations.

Further, in FIG. 1, a double arrow, which illustrates a main demolding direction for the structural component 10, is indicated by 46. In the exemplary embodiment, the main demolding direction 46 is parallel or substantially parallel to the vertical 44. However, this is not to be understood to be limiting.

Design elements of the structural component 10, which can be demolded in the main demolding direction 46 reduce the manufacturing effort and the tooling effort, and, in particular, the effort required to produce an injection mold for producing the structural component 10. According to an exemplary embodiment, the structural component 10 can be manufactured with an open-close mold, without lateral slides, movable cores and the like. Other designs are nevertheless conceivable.

An edge region 48 surrounds the container section 20. In the embodiment, the edge region 48 is provided at the upper end of the container section 20. The edge region 48 surrounds the container section 20 similar to a collar or brim. In exemplary embodiments, the structural component 10 is self-supporting or at least partially self-supporting in design. This includes, for example, receiving/supporting the structural component 10 primarily via the edge region 48 and fasteners 50 disposed there. In other words, for example, the bottom region 24 and/or the container section 20 "hang" freely without additional support, at least sectionally. Due to the not inconsiderable size of the structural component 10 and the container section 20, this necessitates measures for increasing strength and for stiffening.

FIG. 2 shows a perspective side view of a front body 62 of a vehicle 60. The front body 62 houses a structural component in the form of a trunk pan 12. The trunk pan 12 includes a bottom region 24 and an opening 36 facing away therefrom. In the embodiment shown in FIGS. 1 and 2, the edge region 48 surrounds the opening 36 of the compartment 22. The opening 36 and the compartment 22 may be closed by a front hood 64.

The illustration according to FIG. 2 further illustrates that in the exemplary embodiment, the bottom region 24 is oriented substantially horizontally. In contrast, the edge region 48 or the opening 36 define a plane 66 that is slightly inclined downward in the direction of travel 38 (forward travel). In this way, the demand for a low flow resistance at the front end 62 is taken into account. The arrangement of the trunk pan 12 shown in FIG. 2 is particularly suitable for battery electric vehicles (BEV), but also for other types of vehicles. In a fundamentally similar manner, structural components according to the disclosure can be provided in the rear body or elsewhere on a vehicle.

Figure 3:
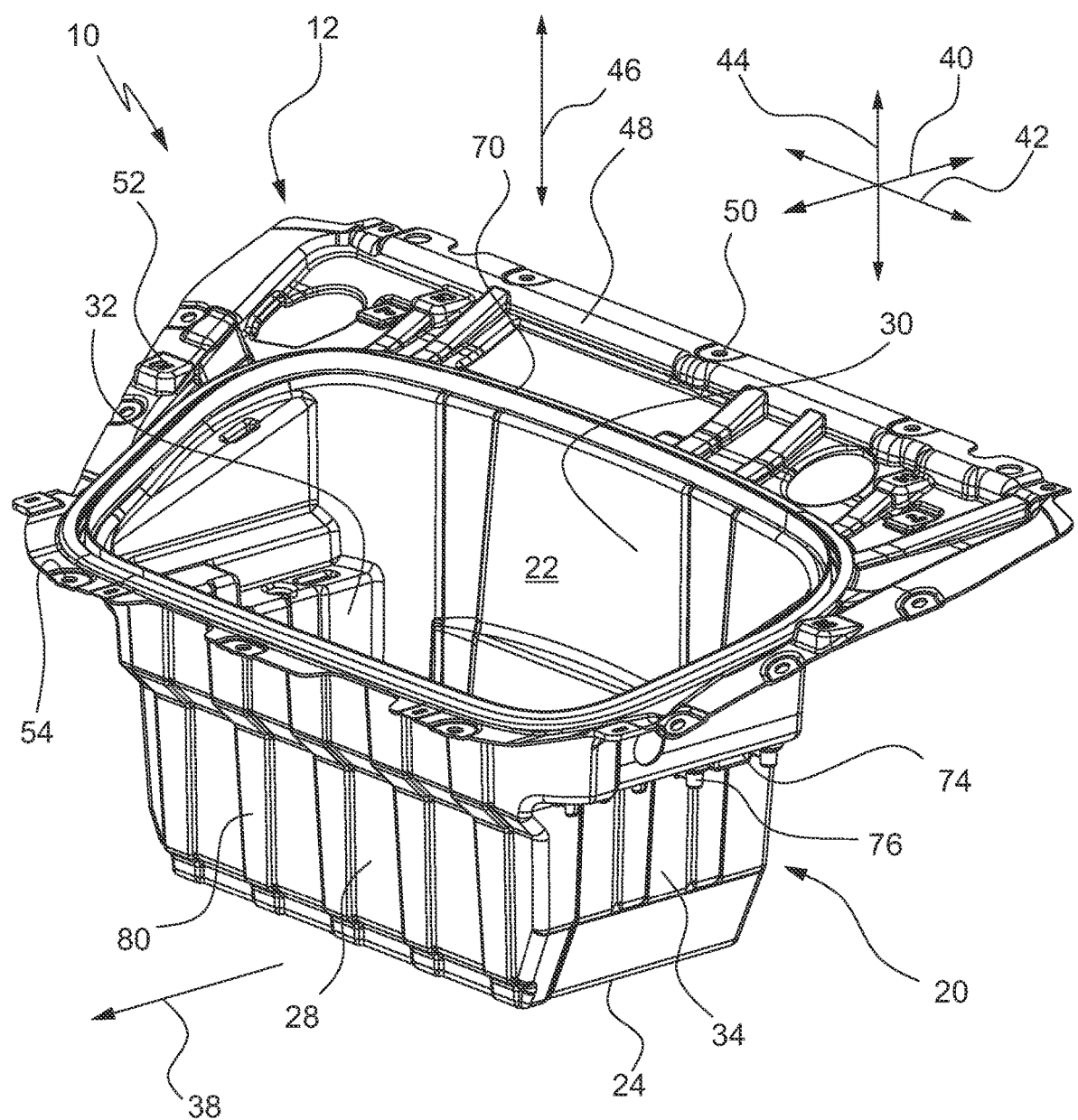
FIG. 3: is a perspective view of an embodiment of a structural component further detailed compared to the embodiment in FIG. 1.
Figure 4:
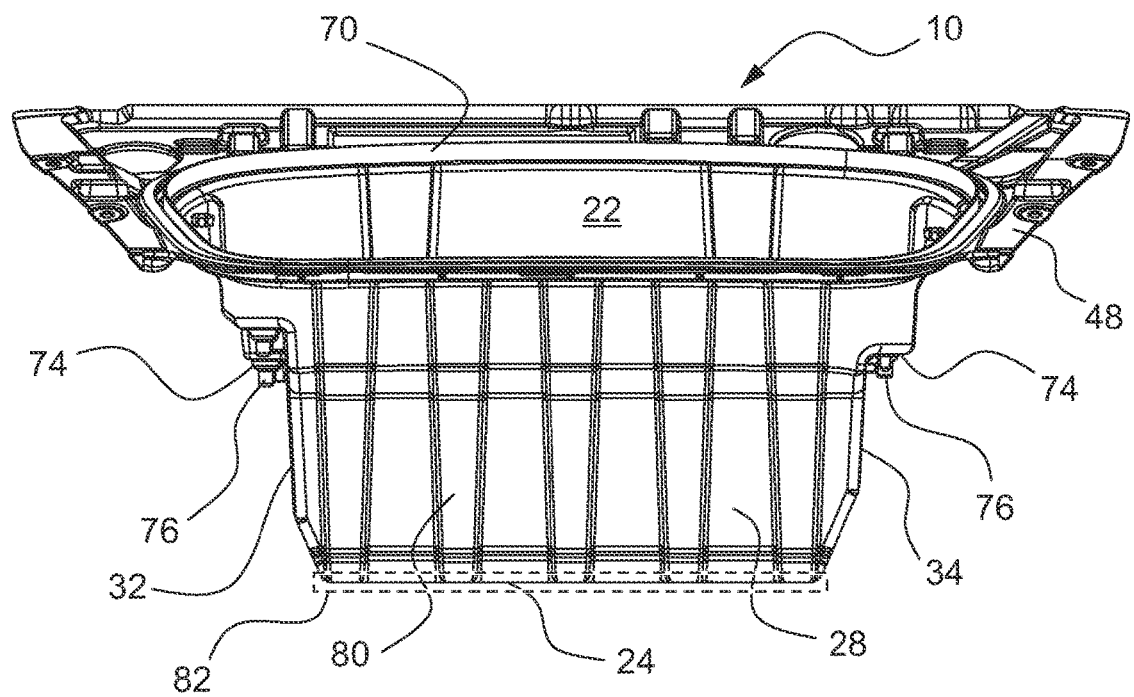
FIG. 4: is a frontal view of the structural component according to FIG. 3.
Figure 5:
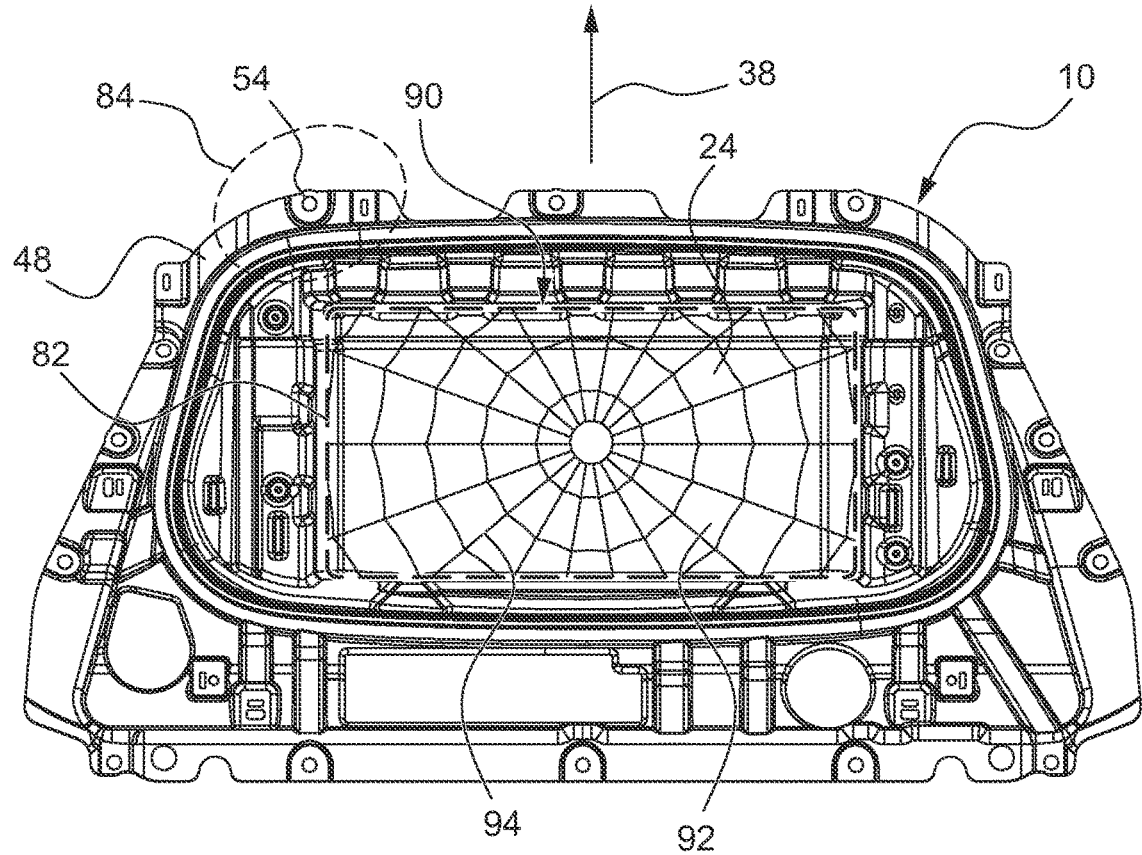
FIG. 5: is another view of the structural component according to FIG. 3, from below.
Figure 6:
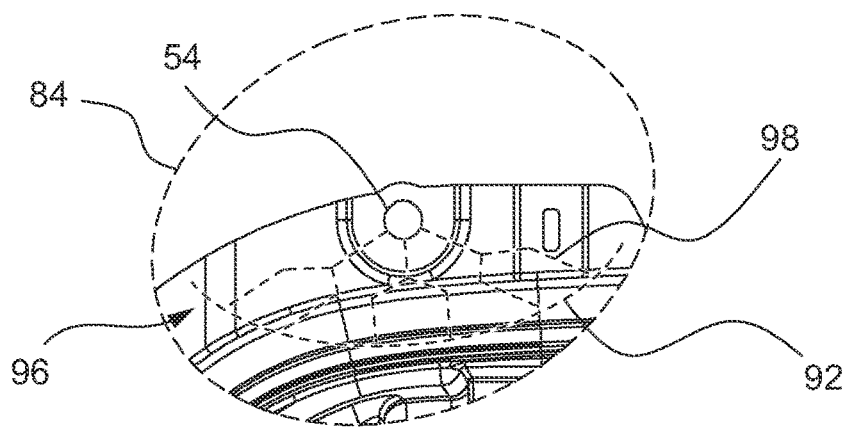
FIG. 6: is a detailed view of the structural component shown in FIG. 5.

With additional reference to FIGS. 3-6, based on FIGS. 1 and 2, the structural component 10 shown therein in greater detail is elucidated. FIG. 3 shows a perspective view. FIG. 4 shows a frontal view, and FIG. 5 shows a bottom view. FIG. 6 shows a detailed view of a section shown in FIG. 5.

The structural component 10 functions as a (front) trunk pan 12 and is provided with a trough-shaped or pan-like container section 20 surrounding a compartment (interior) 22. The container section 20 includes a bottom region 24 and wall regions 28 (front wall), 30 (rear wall), 32 (side wall), 34 (side wall). An edge region 48 is provided above the container section 20 of the structural component 10, which is designed as a circumferential edge region. Major sections and design elements of the structural component 10 can be demolded in the main demolding direction 46.

The edge region 48 is inclined slightly downward in the direction of travel 38. The structural component 10 is suitable for use as a trunk pan 12 in the front end 62 of a vehicle 60, compare again FIG. 2. The compartment 22 acts as an interior space for receiving luggage and the like. During operation of the vehicle, certain loads may be exerted on the structural component 10 and in particular the container section 20 by such cargo.

On the one hand, this relates to static loads caused by the weight of the cargo. In addition, inertia-related dynamic loads can occur, for example forces and impacts in the vertical direction when driving through potholes (compare double arrow 44). Such loads act vertically on the bottom region 24, for example. During acceleration and braking, forces can occur in the longitudinal direction (double arrow 40), for example, forces and impacts on the rear wall 30 during acceleration and forces and impacts on the front wall 28 during braking. Forces and impacts oriented in the transverse direction (double arrow 42) may occur on the side walls 32 (left turn) or 34 (right turn) during cornering. The structural component 10 should be designed to permanently withstand such loads and impacts. If possible, this should be achieved with a low weight (equivalent to material needed).

In accordance with the present disclosure, the plastic injection molding material of the structural component 10 is designed to be porous, at least sectionally, thereby reducing the overall density of the component. In certain embodiments, areas close to the surface of the structural component 10 are designed to be compact (non-porous). On the other hand, in certain embodiments, the core within the component is made to be porous. Thermoplastic foam injection molding is suitable for this purpose. In this way, considerable weight savings can be achieved compared with compactly designed structural components with comparable strength and stiffness. This is also possible on an industrial scale in the area of mass production or series production with high process reliability. Furthermore, thermoplastic foam injection molding can be used to process so-called biopolymers and/or so-called recycle material as required. In this way, the proportion of petroleum-based primary raw materials can be reduced.

The structural component 10 shown in FIGS. 3, 4 and 5 as a trunk pan 12 has various fastening elements 50, 52, 54, which in the exemplary embodiment are formed in the edge region 48. By way of example, a recess in the form of a through hole is suitable as a fastening element. A fastening element, for example in the form of a screw, a plug or a rivet, can be passed through here. Other fastening elements are conceivable, such as open or closed recesses, adhesive surfaces, bearing surfaces, fitting surfaces, projections and the like. Fastening elements can be designed for force-fit/friction-fit fastening, materially-bonding fastening and/or form-fit fastening.

In the exemplary embodiment, a sealing portion 70 is provided at the transition between the container section 20 and the edge region 48, which is for instance configured as a circumferential sealing portion. In this way, a seal can be accommodated at the sealing portion 70. Thus, a sufficiently tight covering of the trunk pan 12 can result, for example, when the hood is closed at the vehicle.

FIGS. 3 and 4 show that the structural component 10 further comprises a support region 74 in the region of the side wall 32 and the opposite side wall 34, which is formed approximately as a step in the side wall 32, 34. The structural component 10 can also be supported and at least sectionally fastened via the respective support region 74. Fastening elements 76, which in the exemplary embodiment are designed approximately as projections in the form of domes, are suitable for fastening. In this way, the actual unsupported area of the structural component 10 can be reduced. Furthermore, FIGS. 3 and 4 show in combination vertically extending stiffening elements 80 arranged in the wall regions 28, 30, 32, 34. The stiffening elements 80 are for instance designed as beads or bulges with vertical longitudinal extension. The stiffening elements 80 are demoldable in the main demolding direction 46.

In FIG. 4, 82 indicates an application area that includes at least a portion of the bottom region 28 of the structural component 10. In the application area 82, measures to increase strength/stiffness are recommended. FIG. 5 shows a view of the structural component 10 from below, with application area 82 highlighted as an example. There—in the bottom region 24—a stiffening structure 90 with a bionic design engineered pattern 92 is provided. The bionic design engineered pattern 92 includes stiffening elements 94, such as in the form of beads or ribs. In the embodiment, the bionic design engineered pattern 92 is modeled after a spider web, with stiffening elements 94 in the form of ribs replicating the formation. In this way, a sufficiently resilient stiffening structure 90 can be produced with a low material input (at low weight).

Further, in FIG. 5, a local application area is designated by 84, which in the exemplary embodiment is arranged in the vicinity of the fastening element 54 in the edge region 48. It is understood that the edge region 48 may also serve as an application region in other sections or circumferentially. FIG. 6 shows an enlarged view of the application area 84 adjacent to the fastening element 54. A stiffening structure 96 having a bionic design engineered pattern 92 is provided, which includes stiffening elements 98. The stiffening elements 98 have a fanned out design. The bionic design engineered pattern 92 is modeled after the leaf structure of a water lily, in particular the support structure of the leaf blade (compare Amazon giant water lily, leaf underside). A segment of this biological formation is adapted to the given shape in the vicinity of the fastening element 54. This stiffening structure 96 may be provided distributed around the edge region 48 of the structural component 10, at least covering further portions thereof.

Figure 7:
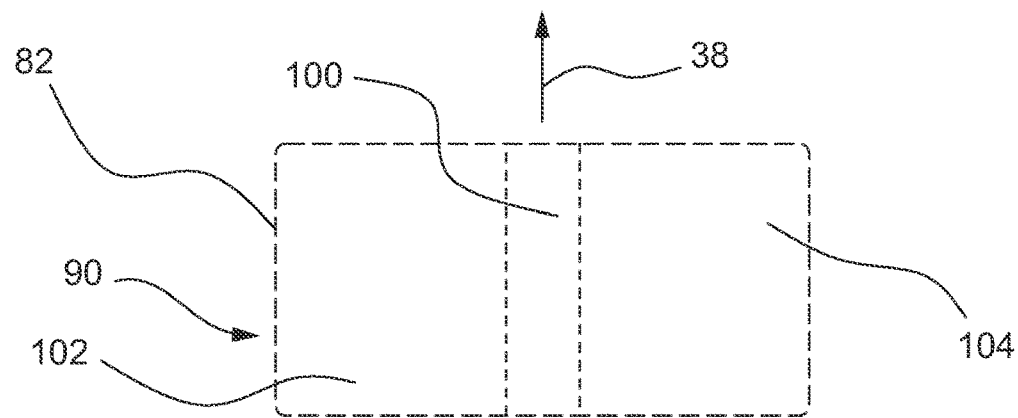
FIG. 7: is a schematic view illustrating a stiffening structure with different sections.

FIG. 7 illustrates, by means of a schematically highly simplified representation, a further embodiment of a stiffening structure 90 that is applied to an application area 82, compare the application area 82 in the bottom region 24 in FIGS. 4 and 5. In FIG. 7, the application area 82 is divided into a plurality of sections 100, 102, 104, in which the stiffening structure 90 is formed. Arrow 38 indicates the direction of travel and thus the arrangement of the sections. The section 100 is a central, middle section. Sections 102, 104 are lateral sections, between which the section 100 is disposed.

Figure 8:
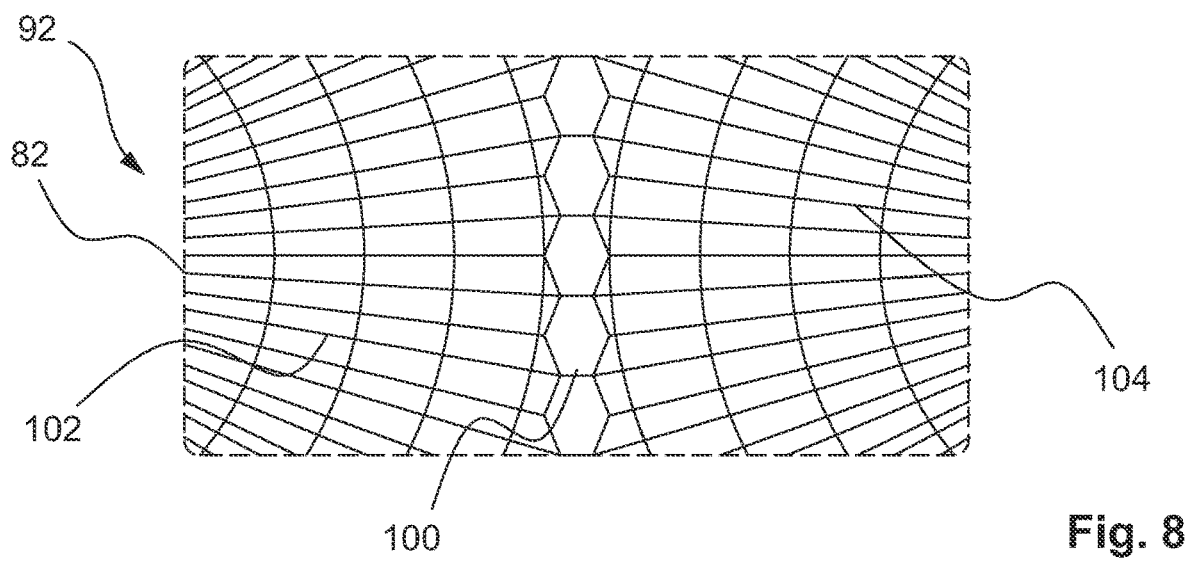
FIG. 8: is another schematic view of a stiffening structure with different sections based on bionic design engineered patterns.

FIG. 8 is based on the embodiment shown in FIG. 7 and shows that the bionic design engineered pattern 92 in the sections 100, 102, 104 can have various biological formations as a model. Section 100, for example, is modeled on a turtle shell. Sections 102, 104 each have a segmental portion with a radially oriented radiating design and reinforcing concentrically oriented annular portions. The formations arranged in the sections 100, 102, 104 can form stiffening elements, in particular ribs in the bottom region 24 of the structural component 10, compare again FIG. 4 and FIG. 5. In the exemplary embodiment, the formations of the lateral sections 102, 104 are fanned out in the direction of the section 100. In the exemplary embodiment, the imaginary center of the formations in the lateral sections 102, 104 is placed outside the application area 82.

Figure 9:
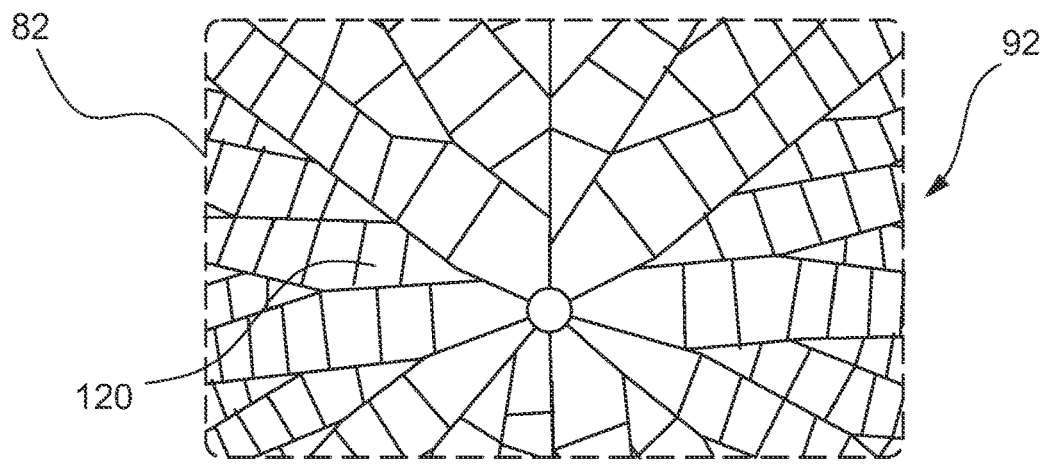
FIG. 9: is another schematic view of a stiffening structure with a bionic design engineered pattern.

Similarly, FIG. 9 illustrates a scope 82 for a bionic design engineered pattern 92. The formation 120 formed in FIG. 9 mimics the leaf structure of a water lily, in particular the support structure of the leaf blade (compare Amazon giant water lily, leaf underside). Also in this way, a good trade-off between strength and weight can be achieved. If such a structure is provided in the bottom region 24 of a structural component 10 that serves as a trunk pan 12, a favorable adaptation to the load case "pothole" results.

Figure 10:
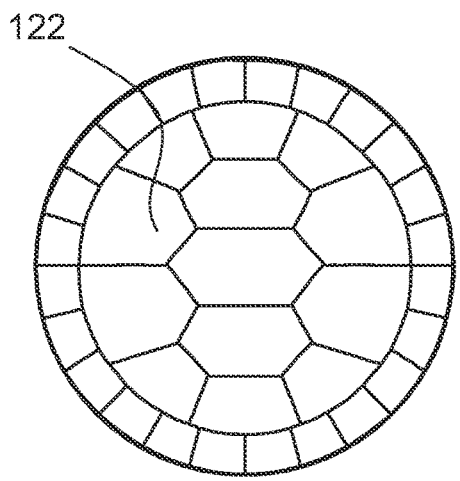
FIGS. 10-15: are various schematic representations of bionic design engineered patterns that can be used to form stiffening structures.
Figure 11:
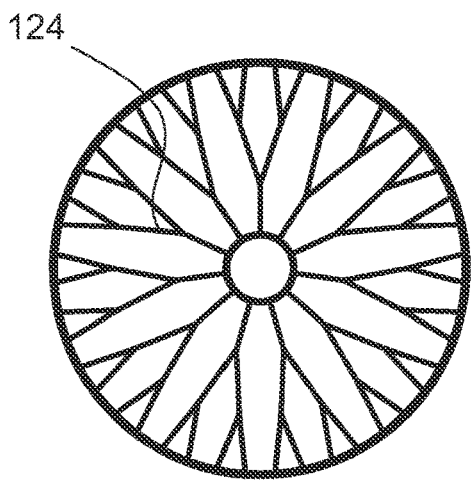
Figure 12:
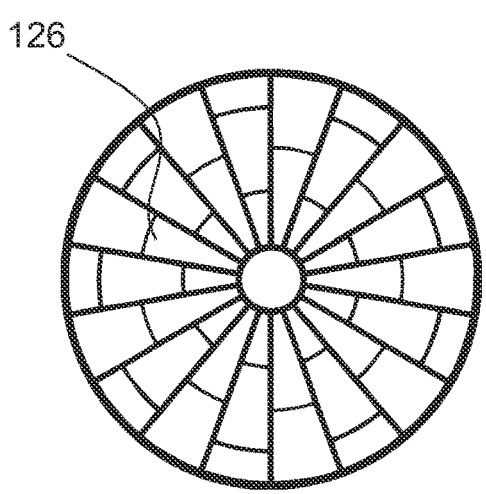
Figure 13:
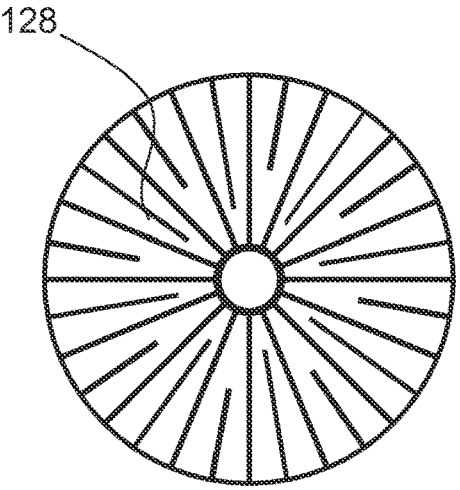

FIGS. 10-13 illustrate other bionic design engineered patterns that mimic biological formations. These patterns can serve as models for a selected stiffening structure in structural component 10. FIG. 10 shows a formation 122 modeled after a turtle shell. FIG. 11 shows a formation 124 modeled after the lamellar structure on the underside of a mushroom cap. The formation 124 is bifurcated or branched. FIG. 12 shows a formation 126 mimicking the lamellar structure on the underside of a mushroom cap. Formation 126 is radially oriented, with radial lamellae connected to adjacent lamellae via connecting lamellae offset from one another. FIG. 13 shows a formation 128 based on the lamellar structure on the underside of a mushroom cap. The formation 128 is radially oriented, with intermediate lamellae arranged between radially extending lamellae, also with radial orientation, which are spaced from the center of the pattern.

Figure 14:
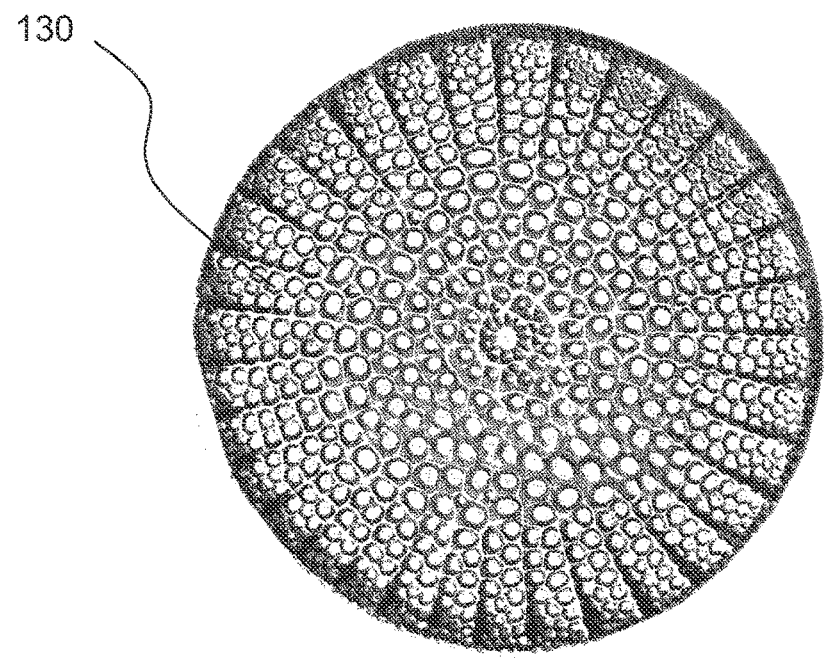
Figure 15:
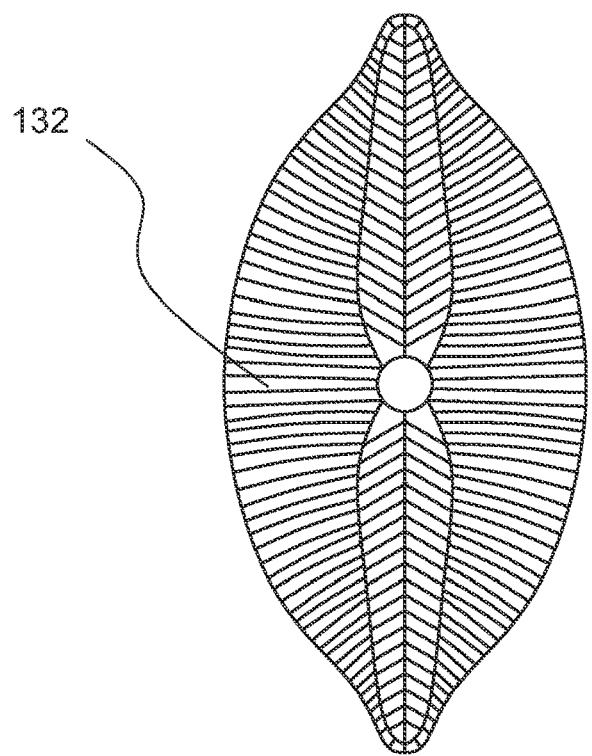

FIG. 14 and FIG. 15 show other bionic design engineered patterns that mimic biological formations, namely diatoms (rock algae). FIG. 14 shows a formation 130 with centric orientation, where the resulting pattern has concentric and radial elements. FIG. 15 shows a formation 132 with a boat-shaped orientation (pennate diatoms) and a rod-shaped inner structure arranged in a bulbous outer shape, extending from a center to both ends of the boat shape. The formations 130, 132 can be used as models for stiffening structures with respectively designed stiffening elements (in particular ribs or corrugations).

Figure 16:
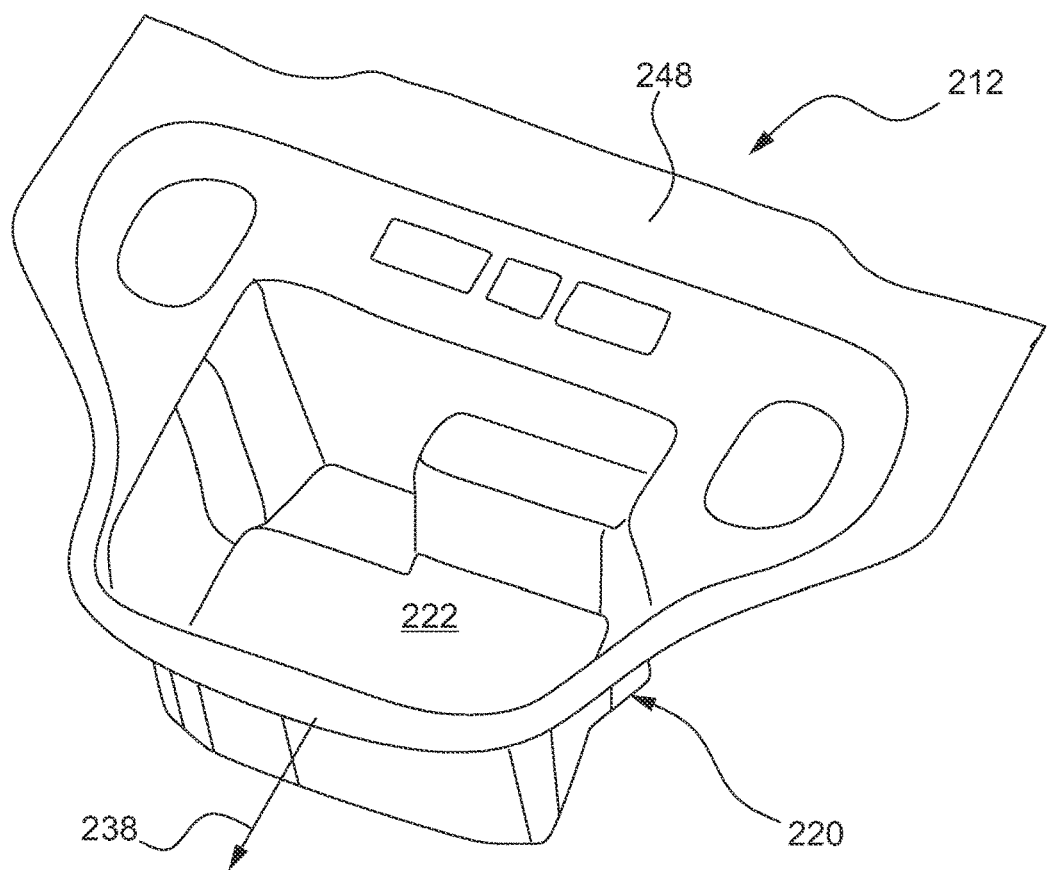
FIG. 16: is a simplified perspective view of an embodiment of a structural component that serves as a container.

FIG. 16 shows a perspective schematic view of another structural component usable as a trunk pan 212. By way of example, FIG. 16 indicates the surfaces of the trunk pan 212 facing a user when the same is installed in a front end of a vehicle. The trunk pan 212 has a container section 220, which is formed in the manner of a trough or tray and defines a compartment 222. In the upper region, a surrounding edge region 248 adjoins the container section 220 and supports the container section 220, at least sectionally.

Figure 17:
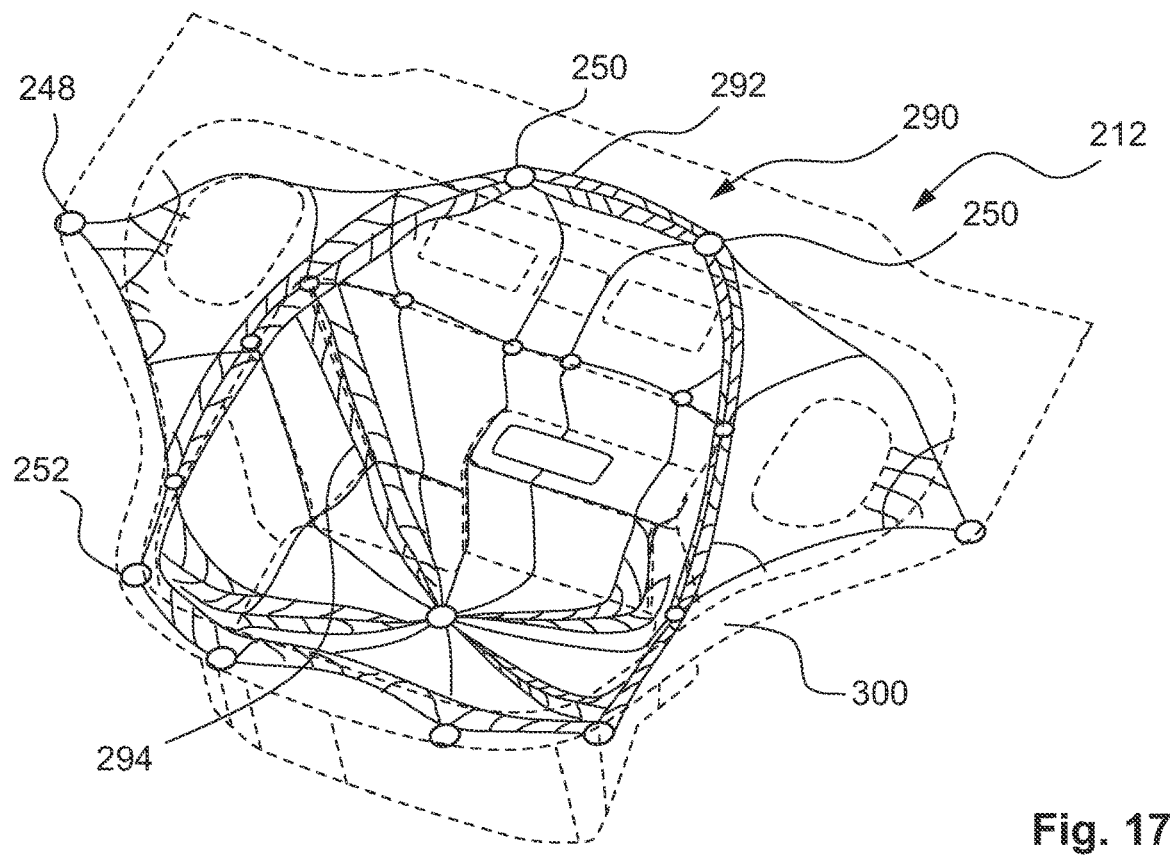
FIG. 17: is another perspective view based on FIG. 17 to illustrate a framework-type bionic design engineered stiffening structure.

The structure of the trunk pan 212 shown in FIG. 16 is shown dashed in FIG. 17, where it forms a tray-shaped insert 300. FIG. 17 shows that the trunk pan 212 includes a stiffening structure 290 having a bionic design engineered pattern 292. In the exemplary embodiment, the stiffening structure 290 forms a kind of skeleton, skeleton or frame for the tub-shaped insert 300. The mesh-like stiffening structure 290 comprises stiffening elements 294 that form straps or belts connecting neuralgic points of the structural component forming the trunk pan 212. In this way, the framework for the insert 300 received therein or held thereon is obtained. The stiffening structure 290 extends over fastening elements 250, 252, 254 and connects them to each other via straps or bands. In this way, an organic lightweight structure adapted to the given loads is obtained, which nevertheless provides the required strength. Here, too, a porous inner structure produced by means of foams can contribute to further weight savings.

Figure 18:
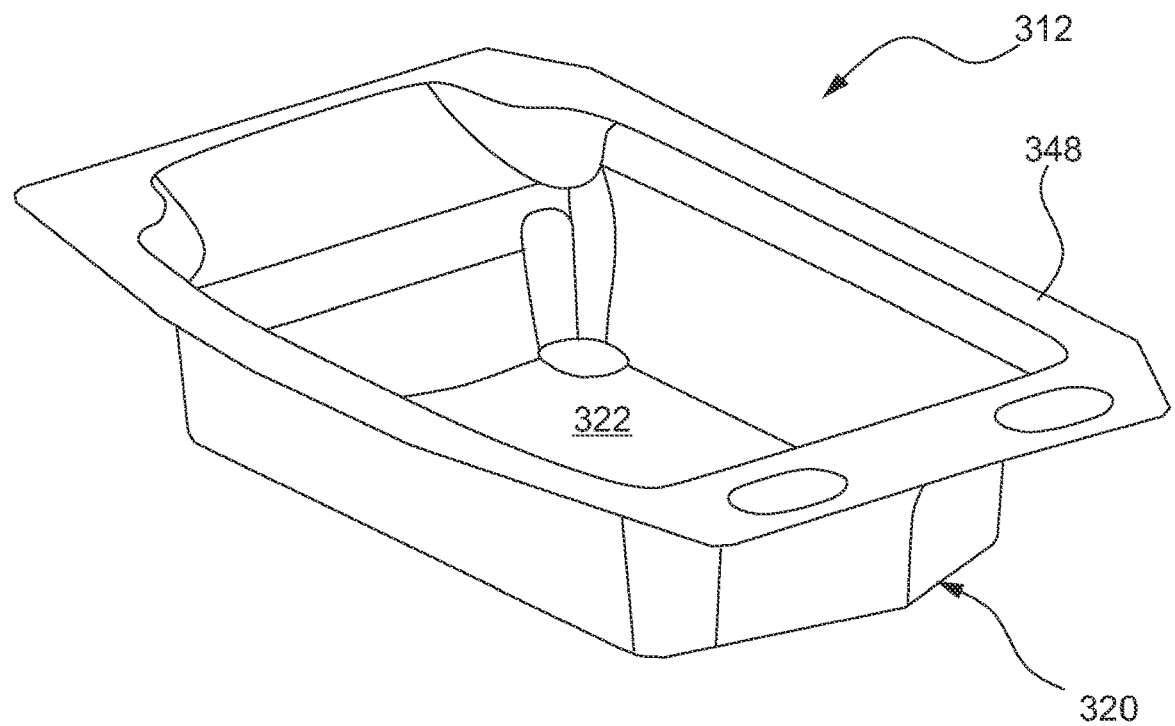
FIG. 18: is a perspective view of a further embodiment of a structural component that serves as a container.

FIG. 18 illustrates, by means of a perspective view, a further structural component, which, in the exemplary embodiment, is designed as a trunk pan or spare wheel pan 312. Similar to the previously described structural components, the spare wheel pan 312 has a container section 320 that includes a compartment 322. The compartment 322 is configured to receive a spare wheel, for example. A surrounding edge region 348 is formed at the upper end of the container section 320.

The structural component illustrated in FIG. 18 can also have a porous internal structure created by means of foaming, which contributes to weight savings. Furthermore, stiffening structures can be formed with bionic design engineered patterns that utilize biological formations. Other conceivable structural components include housings for control units and other electronic components, housings for air filters, fuse boxes and the like. Such structural components can also be produced by means of foaming and/or bionic design engineered patterns with high strength on the one hand and low weight on the other.

Figure 19:
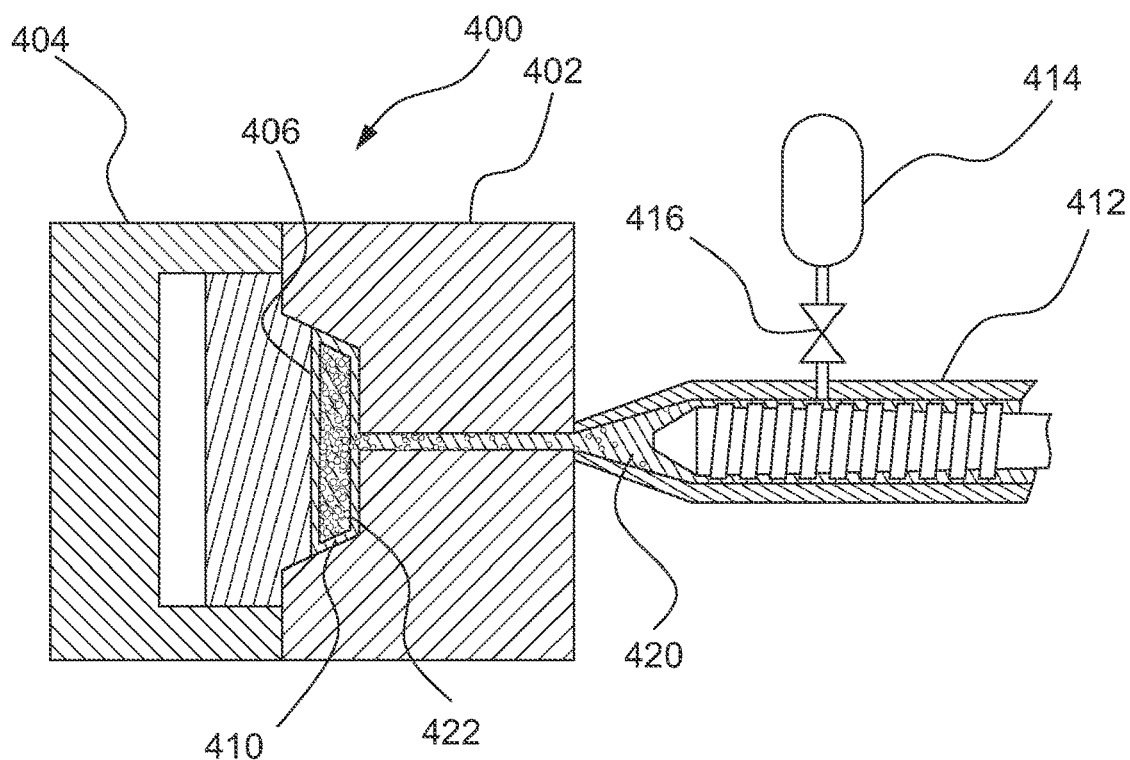
FIG. 19: is a schematic, simplified view of a mold for illustrating a process for producing a foamed injection molded component.

FIG. 19 illustrates, by means of a schematic, highly simplified illustration, a mold 400 for producing a component 410 by means of thermoplastic foam injection molding. The mold 400 includes a nozzle side 402 and an ejector side 404, which together form a mold (cavity) 406 for the component 410. In the exemplary embodiment, an extruder 412 couples to the nozzle side 402 to introduce a molten molding compound 420 (typically glass fiber reinforced polymers) under pressure into the mold 406 in the mold 400 to form the component 410. However, further a reservoir 414 or supply line for a foaming agent is coupled to the extruder 412, wherein the foaming agent can be supplied via a valve 416. In this manner, the foaming agent can be added to the molten mass 420 and form a porous region 422 in the component 410. In this way, the overall density of the component 410 can be reduced.

Figure 20:
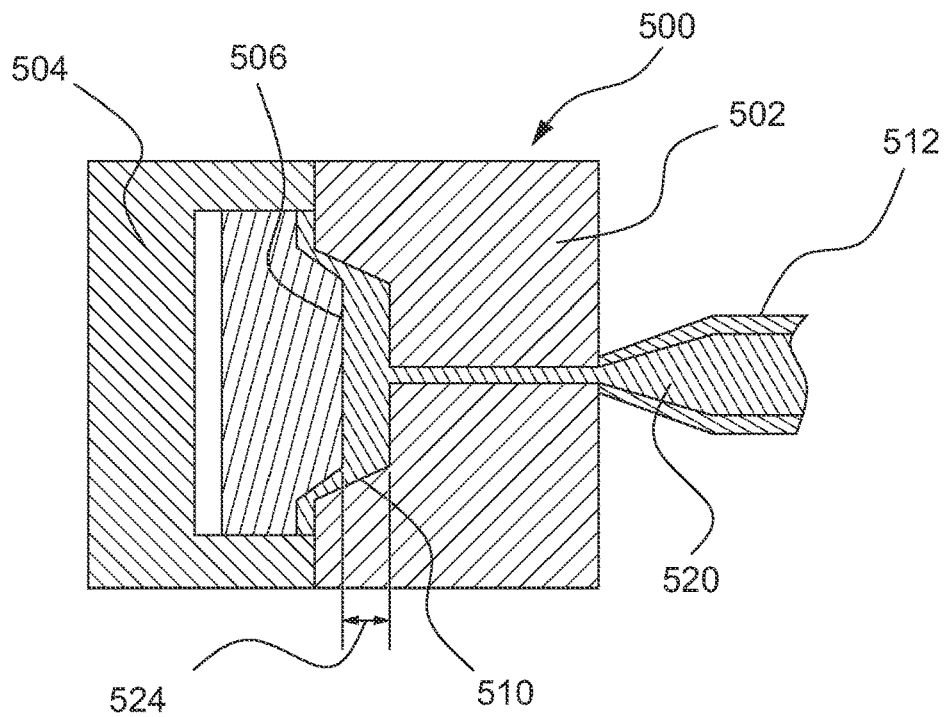
FIGS. 20 and 21: are schematic, simplified views of a mold illustrating a process for producing a reduced density injection molded component produced by negative stamping.
Figure 21:
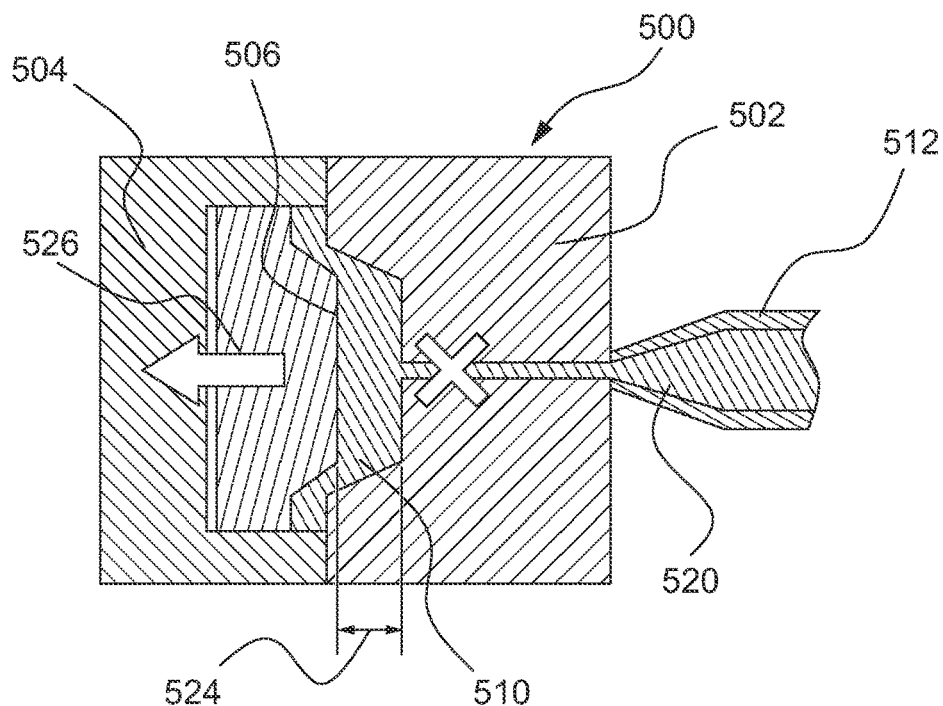

FIGS. 20 and 21 illustrate, by means of a schematic, highly simplified illustration, a tool 500 for producing a component 510. The tool 500 may basically be formed based on the tool 400 shown in FIG. 19. In other words, the tool 500 can also be formed for thermoplastic foam injection molding. The mold 500 has a nozzle side 502 and an ejector side 504, which together form a mold 506 for the component 510. In the embodiment, an extruder 512 couples to the nozzle side 502, which can be used to introduce a molten molding compound (which may or may not have a foaming agent mixed in) under pressure into the mold 506 to form the component 510 there.

The tool 500 is capable of applying a defined opening stroke (arrow 526 in FIG. 21) for the purpose of a so-called negative stamping before the workpiece 510 has completely solidified in its interior. The resulting negative pressure ensures that the workpiece 510 is stretched in the demolding direction, compare the height (wall thickness) 524, which has increased in FIG. 21 compared to FIG. 20. The goal is not to draw material from the extruder 512. Instead, the goal is to increase any porosity that may already exist as a result of thermoplastic foam injection molding by allowing existing pores to occupy a larger space in the component 510 after the opening stroke (return stroke, negative stamping). As a result, the density of component 510 can be further reduced.

Figure 22:
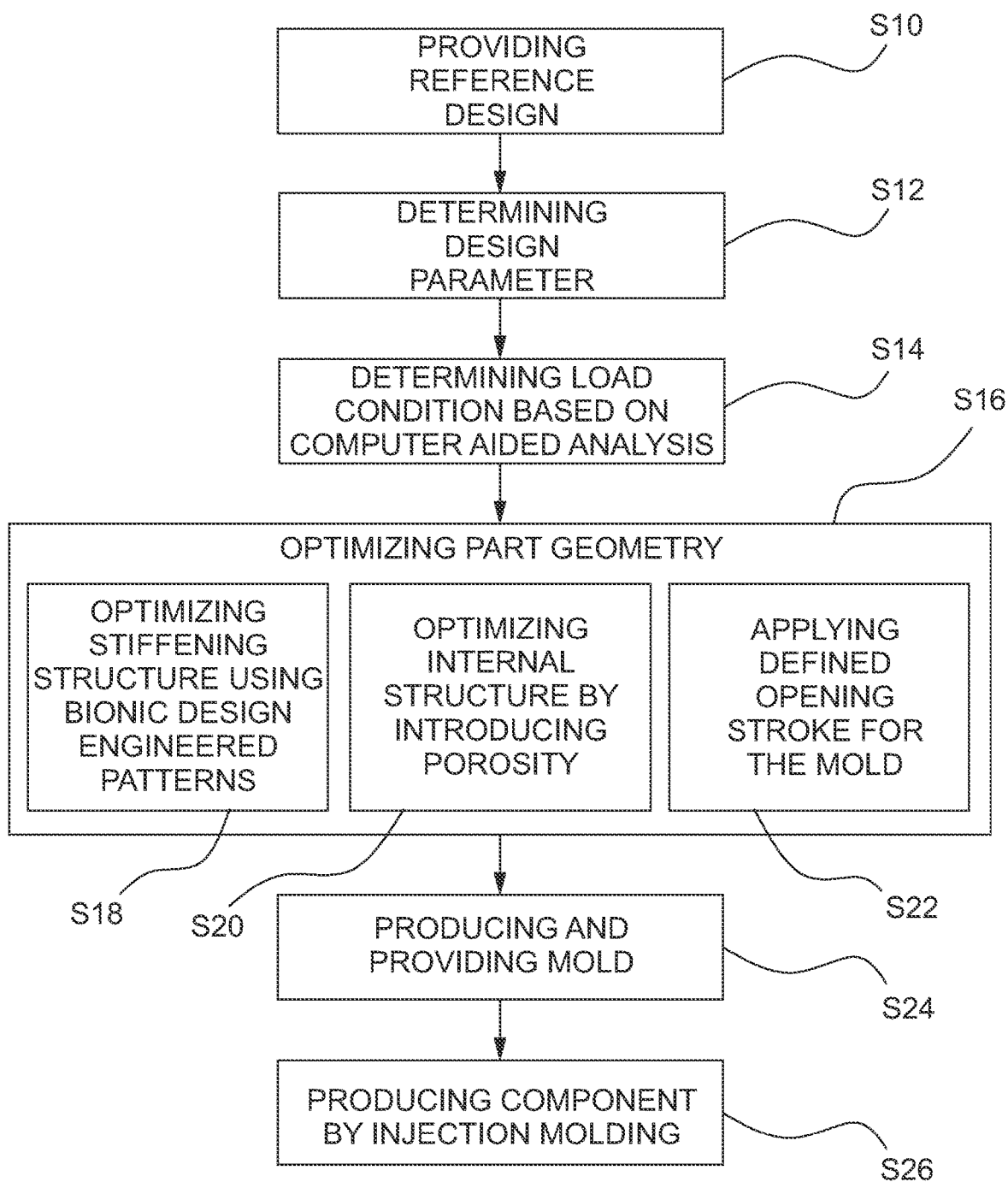
FIG. 22: is a block diagram illustrating an embodiment of a method for providing an injection molded structural component.

With reference to FIG. 22, based on a schematic block diagram an exemplary embodiment of a method for providing a structural component with optimized weight is illustrated.

The method comprises a step S10, which comprises providing a reference design. The reference design is, for example, a design that at least sufficiently satisfies external boundary conditions, for example with regard to installation space, volume in the interior, external dimensions and the like.

This is followed by a step S12, which comprises the determination of at least one design parameter. The design parameter is, for example, a wall thickness of the structural component that may result from measures to increase porosity. The design parameter is, for example, a reduced density resulting from various measures to increase porosity (foaming, backstroke in the mold). The design parameter is, for example, a stiffening structure, such as a selected biological formation to generate a bionic design engineered pattern.

This is followed by a step S14, which comprises a computer-aided analysis to determine a load condition for a given reference load. For example, this includes certain load cases that arise with a given load and certain operating conditions (accelerating, braking, cornering, potholes and the like). These can be static and/or dynamic loads. The analysis is usually computer-aided using FEM or comparable numerically supported methods.

A following step S16 concerns the optimization of the component geometry and includes optional sub-steps S18, S20, S22, which can contribute to an optimization of the geometry of the structural component based on the reference design. This may include a variation of the design parameter. For example, sub-step S18 refers to the optimization of a stiffening structure using bionic design engineered patterns that mimic existing biological formations. In this way, for example, engineering-generated uniform patterns (for example, cross ribs with 90° orientation) can be replaced or supplemented.

For example, the sub-step S20 relates to the optimization of the internal structure of the component with the targeted introduction of a porosity by means of thermoplastic foam injection molding. Any strength losses can be avoided or compensated for by adjusting the wall thickness or the degree of porosity. For example, sub-step S22 relates to a further increase in the degree of porosity of the component by applying a defined opening stroke (return stroke, negative embossing) in the mold as part of the production of the component by means of thermoplastic foam injection molding. Possible strength losses can be avoided or compensated for by adjusting the wall thickness or the degree of porosity.

The sub-steps S20 and/or S22 can result in an increase in wall thickness. However, this does not necessarily lead to an increase in weight if the resulting density can be reduced proportionally or disproportionately. Conversely, components with higher wall thickness often have increased strength and dimensional stability or dimensional stability.

It is understood that the optimization step S16 can also include the selection of a suitable material for the molding compound. Common engineering plastics that can be processed by thermoplastic injection molding are suitable. The materials are usually fiber-reinforced. However, it is also conceivable to use so-called recyclate and/or so-called biopolymers instead of petroleum-based primary raw materials, at least proportionally. In this way, the $CO_2$ balance of the component can be further improved.

Optimization step S16 is followed by step S24, which comprises the generation and provision of a mold for the plastic injection molding process. The mold and, in particular, its shape (cavity) are generated taking into account the optimization results. The mold may be adapted for thermoplastic foam injection molding. The mold may be set up to apply a defined opening stroke (return stroke, negative embossing) to increase an introduced porosity in the component.

This is followed by step S26, which focuses on the actual production of the structural component by injection molding, in particular by thermoplastic foam injection molding.

What is claimed is:

1. A structural component that serves as a container for a vehicle, comprising:
   a trough-shaped container section forming a compartment and defining a bottom region and two or more wall regions, which are at least sectionally inclined with respect to the bottom region,
   an edge region,
   wherein the two or more wall regions are arranged between the bottom region and the edge region,
   fastening elements that are provided in the edge region,
   wherein the fastening elements are arranged and distributed around the container section,
   wherein the container section and the edge region are formed of an injection moldable fiber reinforced thermoplastic material, and
   wherein the structural component at least sectionally has a porous internal structure that is formed by foaming the thermoplastic material.

2. The structural component of claim 1,
   wherein the edge region is in arranged as a circumferential edge region that surrounds the two or more wall regions.

3. The structural component of claim 1,
   wherein the two or more wall regions extend between the bottom region and the edge region, and
   wherein the edge region is configured at least in part as a collar that projects outwardly from the container section.

4. The structural component of claim 1,
   wherein the bottom region is offset from the edge region in a main demolding direction.

5. The structural component of claim 1,
   wherein the structural component is manufactured by an open-close mold.

6. The structural component of claim 1, comprising a circumferential sealing portion adjacent to an upper end of the container section.

7. The structural component of claim 1,
   wherein the fastening elements in the edge region are selected from the group consisting of: adhesive surfaces, mounting holes, domes, protrusions, recesses, and mounting tabs.

8. The structural component of claim 1
   wherein at least one wall region of the two or more wall regions of the container section is stepped and includes a support region extending approximately parallel to the bottom region.

9. The structural component of claim 8,
   wherein at least one fastening element is formed in the support region of the at least one wall region,
   wherein the at least one fastening element in the support region is selected form the group consisting of a raised fastening element, a recessed fastening element, and an adhesive surface.

10. The structural component of claim 1,
    wherein the two or more wall regions of the container section form a front wall, a rear wall, and first and second side walls, and
    wherein the front wall is offset from the rear wall in a direction of travel of the vehicle.

11. The structural component of claim 1,
    wherein the bottom region of the container section extends substantially horizontally, and
    wherein the edge region, defines a plane that is at least approximately inclined with respect to the horizontal and that is inclined downwardly in the direction of travel.

12. The structural component of claim 1,
    wherein at least one wall region of the two or more wall regions of the container section comprises stiffening elements that are demoldable in a main demolding direction, and
    wherein the stiffening elements are arranged in the form of at least one of beads and ribs having a vertical longitudinal extension.

13. The structural component of claim 1,
    wherein the structural component is made at least proportionally from a recyclate material.

14. The structural component of claim 1,
    wherein the structural component is made at least proportionally from an engineered biopolymer.

15. The structural component of claim 1,
    wherein the structural component has a density that is reduced by means-of-negative embossing.

16. The structural component of claim 1,
    wherein the bottom region is designed to be at least sectionally flat and provided with a stiffening structure having a plurality of stiffening elements, and
    wherein the stiffening elements are arranged in the form of at least one of ribs and beads.

17. The structural component of claim 1,
    wherein a stiffening structure is formed in the edge region and adjacent to a fastening element.

18. The structural component of claim 16,
wherein the stiffening structure has ribs that are demoldable in the main demolding direction, and
wherein the ribs are formed on an underside of the bottom region.

19. The structural component of claim 16,
wherein the stiffening structure comprises at least one bionic design engineered pattern having multiple stiffening elements.

20. The structural component of claim 19,
wherein the bionic design engineered pattern is selected from the group of formations consisting of: spider web, bamboo stalk, water lily leaf blade, mushroom lamella, turtle shell, honeycomb, limpet shell, diatoms, and combinations thereof.

21. The structural component of claim 19,
wherein the stiffening structure at the bottom region comprises a central portion having a first bionic design engineered pattern and outer portions adjacent to the central portion having a second bionic design engineered pattern.

22. The structural component of claim 20,
wherein a first bionic design engineered pattern is provided in the central portion, wherein the design of the first bionic design engineered pattern is based on a turtle shell, and
wherein a second bionic design engineered pattern is provided in the outer regions, wherein the design of the second bionic design engineered pattern is based on mushroom lamellae or a spider web.

23. The structural component of claim 1,
wherein the structural component is configured as one of a rear trunk pan, a front trunk pan, a spare wheel pan, and a control unit housing.

24. The structural component of claim 1,
wherein the structural component reinforces a body-side crash structure of the vehicle.

* * * * *